United States Patent
Agata et al.

(12) United States Patent    (10) Patent No.: US 6,766,402 B1
(45) Date of Patent: Jul. 20, 2004

(54) COMPUTER IN WHICH AN OPTIONAL UNIT IS INSTALLABLE

(75) Inventors: Hiroaki Agata, Yokohama (JP);
Takeshi Asano, Atsugi (JP); Hideto Horikoshi, Sagamihara (JP); Takehiko Noguchi, Tokyo-to (JP); Masaki Oie, Sagamihara (JP); Kenshin Yonemochi, Kamakura (JP)

(73) Assignee: International Business Machines Corporation, Armonk, NY (US)

(*) Notice: Subject to any disclaimer, the term of this patent is extended or adjusted under 35 U.S.C. 154(b) by 544 days.

(21) Appl. No.: 09/628,817

(22) Filed: Jul. 31, 2000

(51) Int. Cl.[7] .............................................. G06F 13/00
(52) U.S. Cl. ....................................... 710/302; 439/11
(58) Field of Search ................................ 710/301, 302, 710/303; 343/702; 361/700, 752, 686; 235/492; 439/11

(56) References Cited

U.S. PATENT DOCUMENTS

| | | | |
|---|---|---|---|
| 5,440,449 A | * 8/1995 | Scheer | 361/686 |
| 5,768,163 A | * 6/1998 | Smith, II | 708/105 |
| 5,867,131 A | * 2/1999 | Camp et al. | 343/797 |
| 6,067,057 A | 5/2000 | Yajima et al. | |
| 6,213,403 B1 | * 4/2001 | Bates, III | 235/492 |
| 6,362,794 B1 | * 3/2002 | Yu | 343/702 |
| 6,394,813 B1 | * 5/2002 | Stout et al. | 439/11 |
| 6,456,499 B1 | * 9/2002 | Nakajima et al. | 361/752 |

FOREIGN PATENT DOCUMENTS

| | | |
|---|---|---|
| JP | 07-114434 | 5/1995 |
| JP | 08-129433 | 5/1996 |
| JP | 08-293717 | 11/1996 |
| JP | 09-083229 | 3/1997 |
| JP | 09-289471 | 11/1997 |
| JP | 10-051665 | 2/1998 |
| JP | 10-063808 | 3/1998 |
| JP | 11-053060 | 2/1999 |
| JP | 11-074712 | 3/1999 |
| JP | 2000-196722 | 7/2000 |
| JP | 2001-022474 | 1/2001 |

* cited by examiner

*Primary Examiner*—Glenn A. Auve
(74) *Attorney, Agent, or Firm*—Louis P. Herzberg; David Aker

(57) ABSTRACT

The present invention is directed to a computer in which an optional unit such as a unit including a wireless LAN adapter is installable. The computer including at least a computer body, a display, and a keyboard. The invention is also directed to a note book computer 2, which includes a computer body with a keyboard, and a display workable as a lid being opened and closed free with the computer body. In these computers with an optional unit 14, the optional unit is detachably attached to the top of the display, or the optional unit is detachably attached to a portion of the display, the portion being at a side of the display when the lid is closed and being at a top of the display when the lid is opened.

18 Claims, 12 Drawing Sheets

[Figure 1]
(a)
Unfolding an antenna on the LCD top
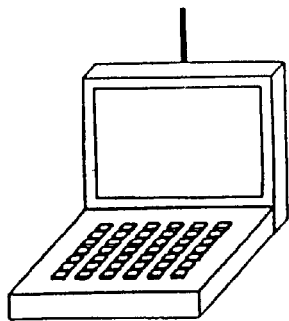
(b)
Unfolding an antenna on the computer body side
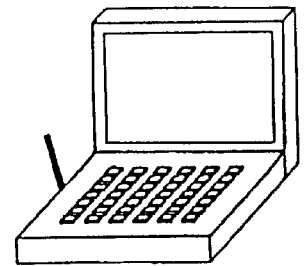
(c)
Fixing an antenna on the LCD top (back)
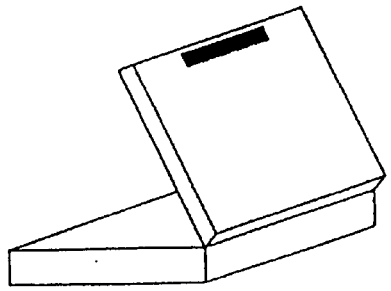
(d)
Fixing an antenna on the LCD top (point end)
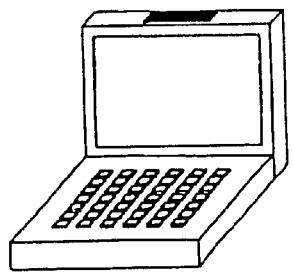
(e)
Fixing an antenna on the computer body side
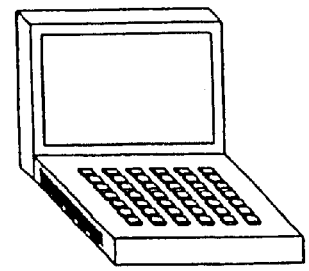

[Figure 2]
(a) 
Dipole Antenna
(b) 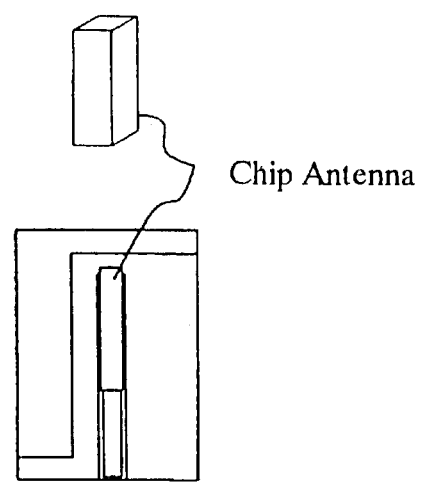
Chip Antenna
[Figure 3]
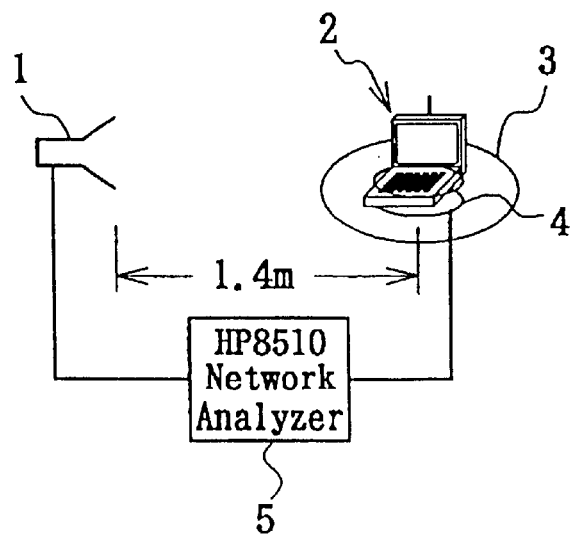

[Figure 4]
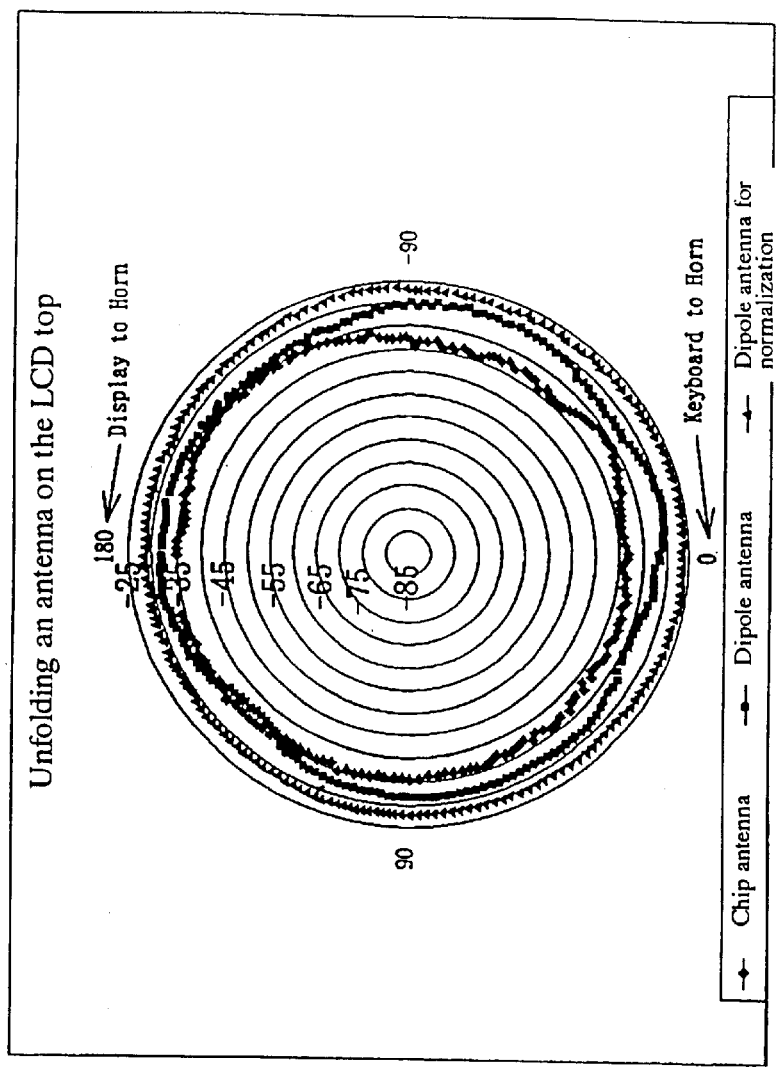

[Figure 5]
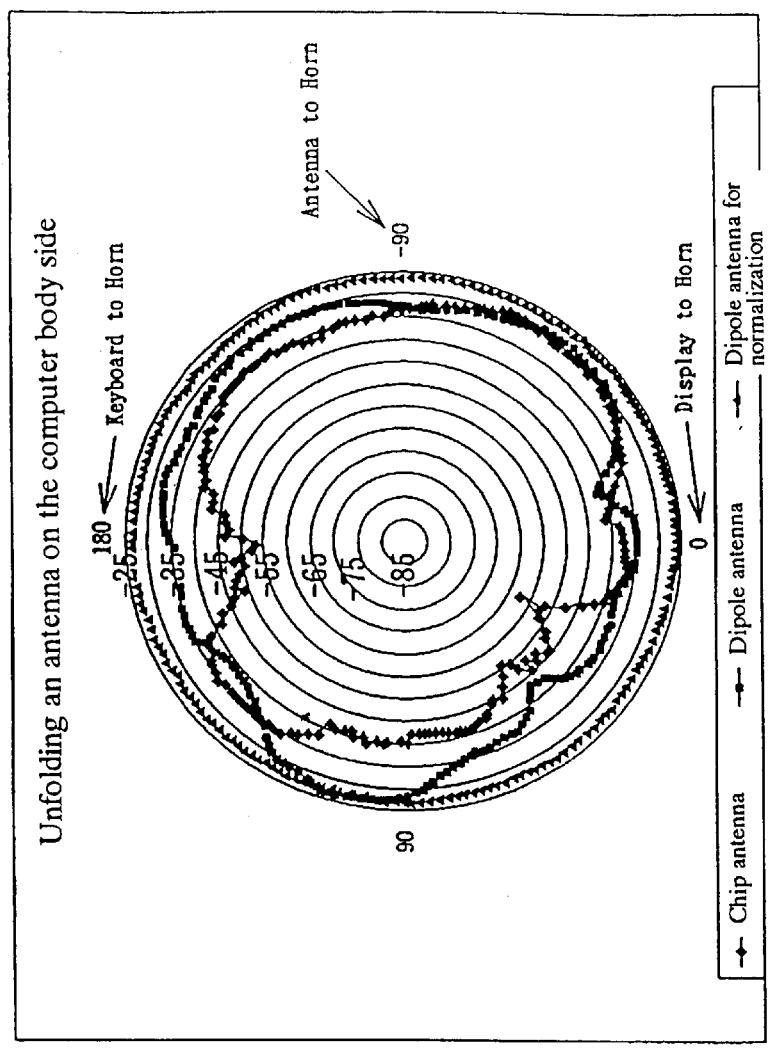

[Figure 6]
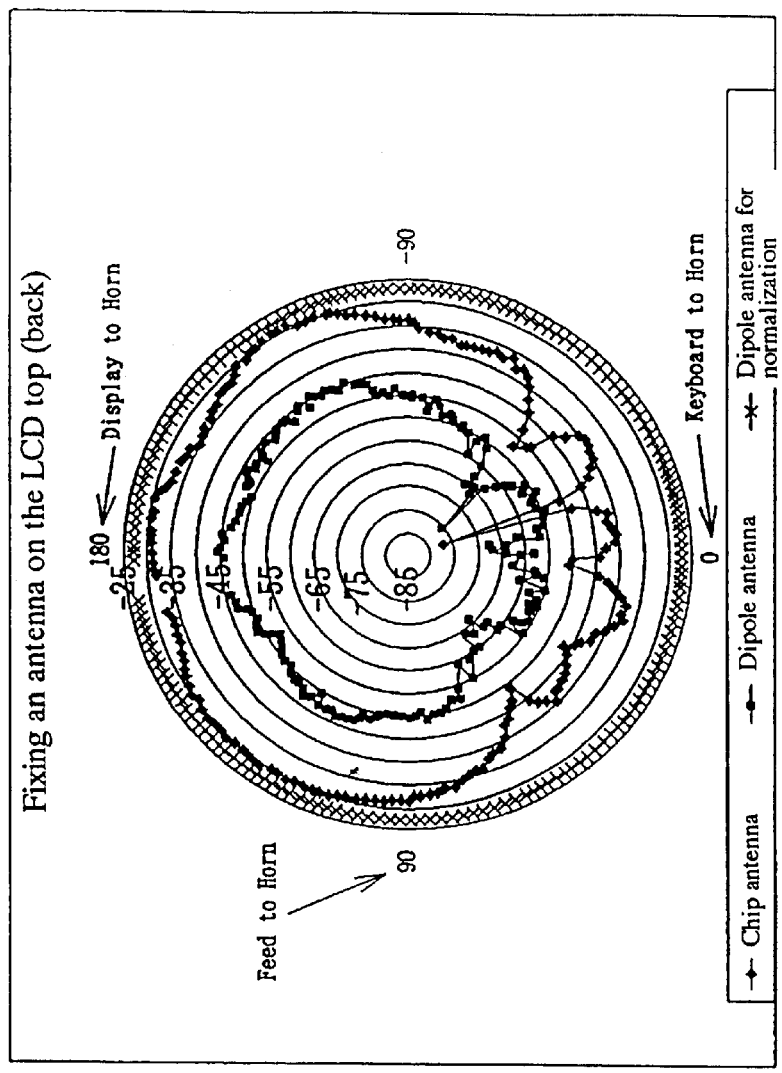

[Figure 7]
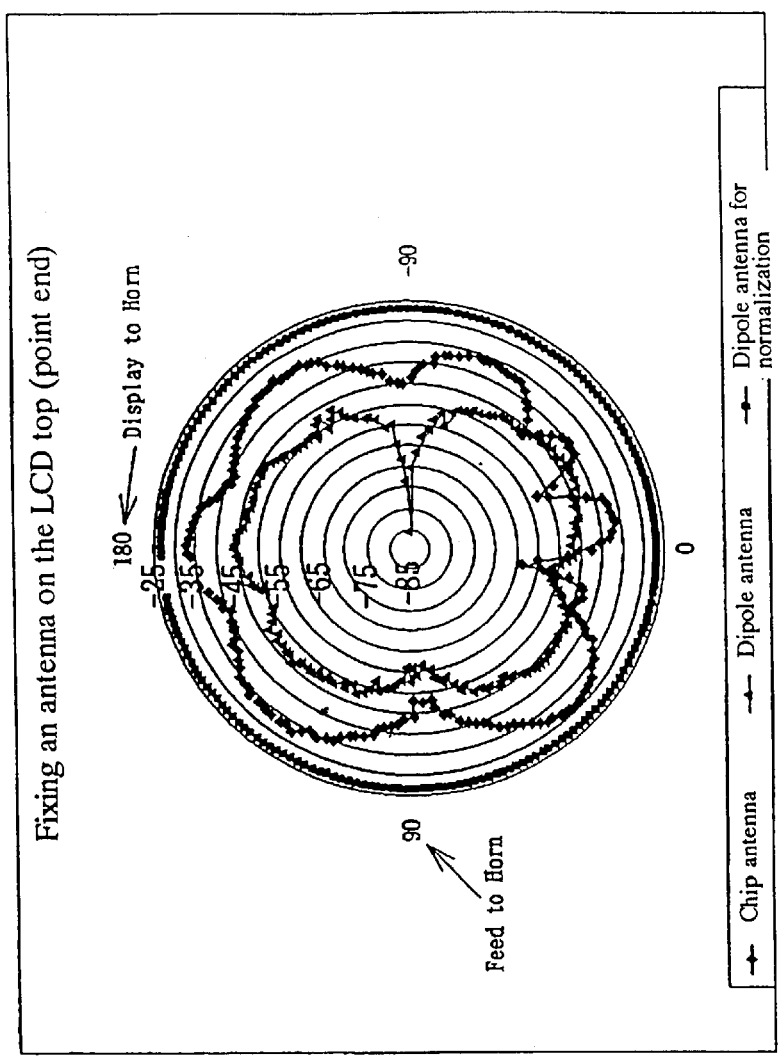

[Figure 8]
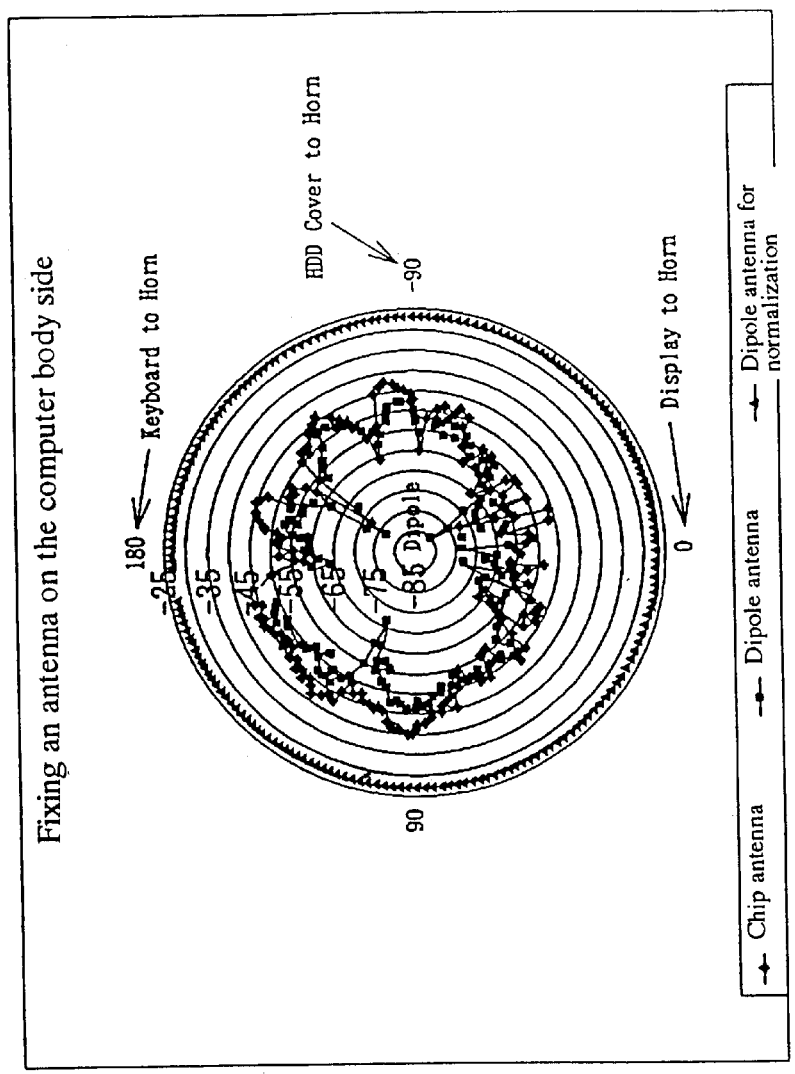

[Figure 9]
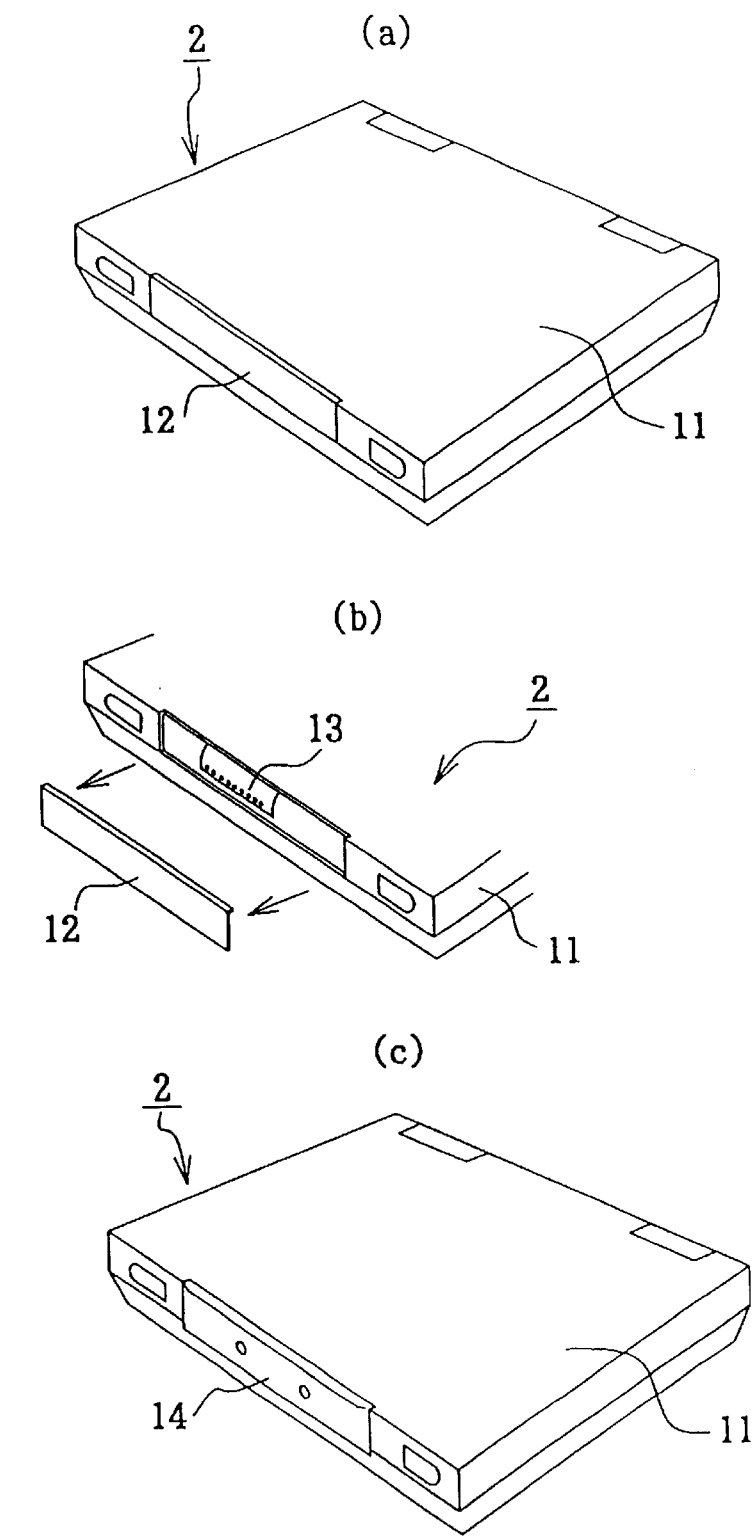

[Figure 10]
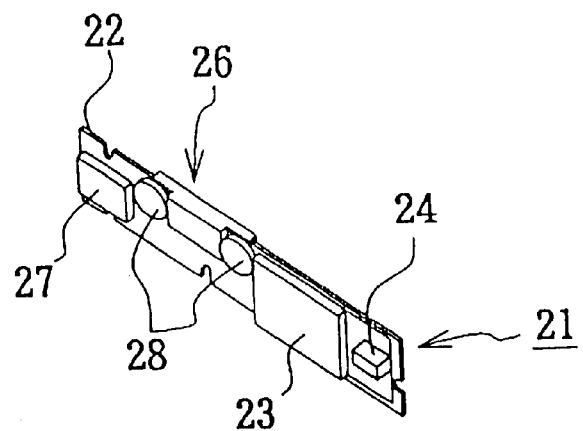
[Figure 11]
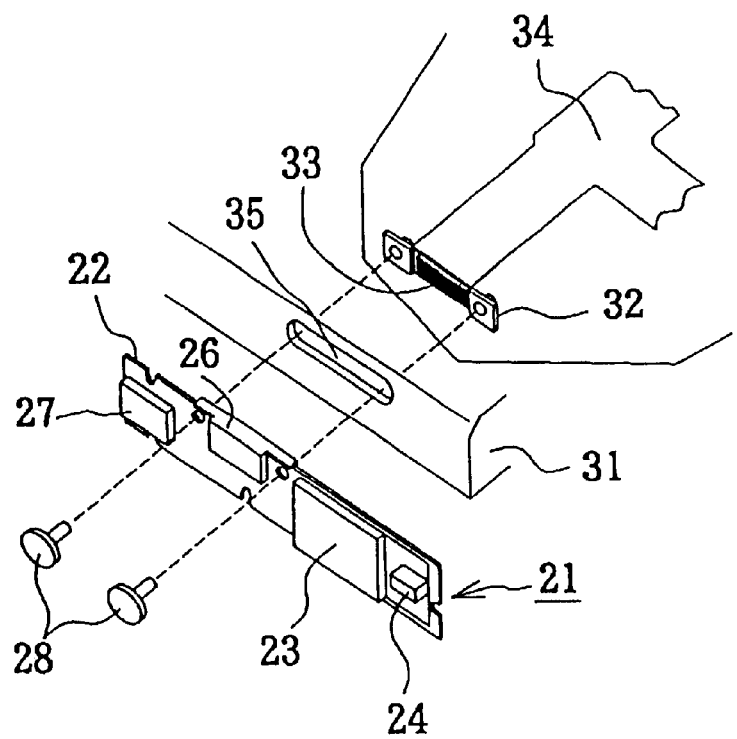

[Figure 12]
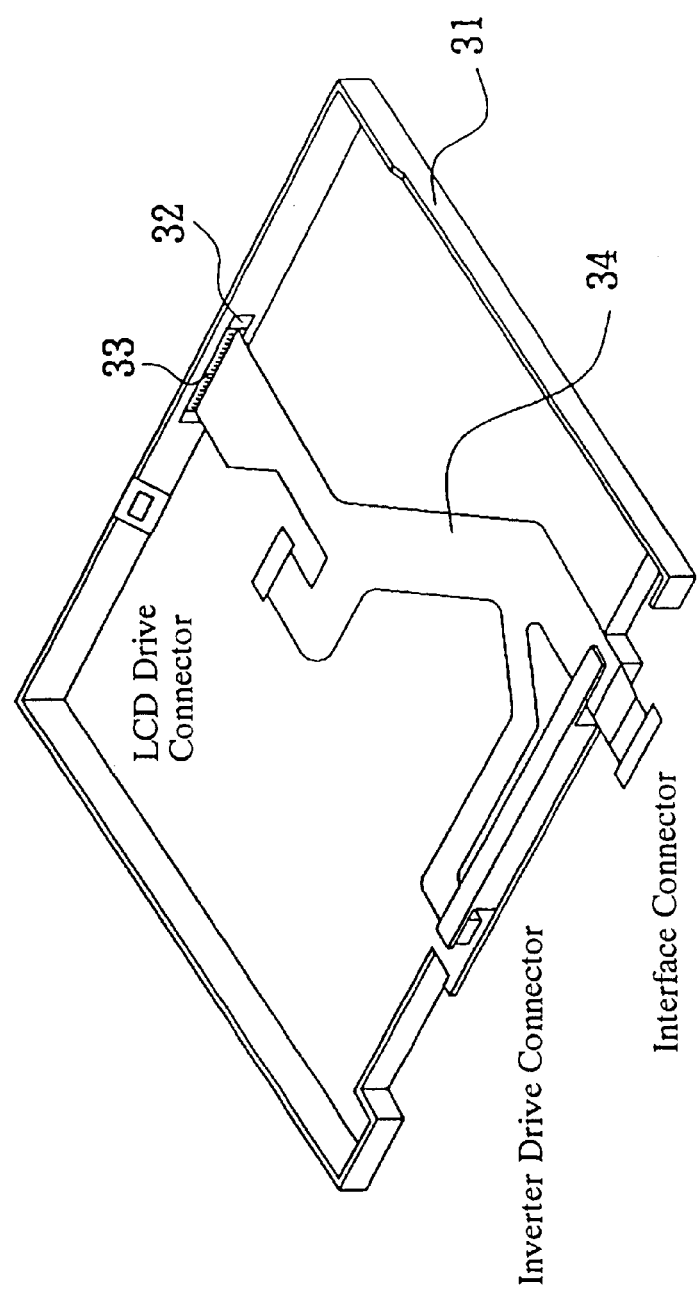

[Figure 13]
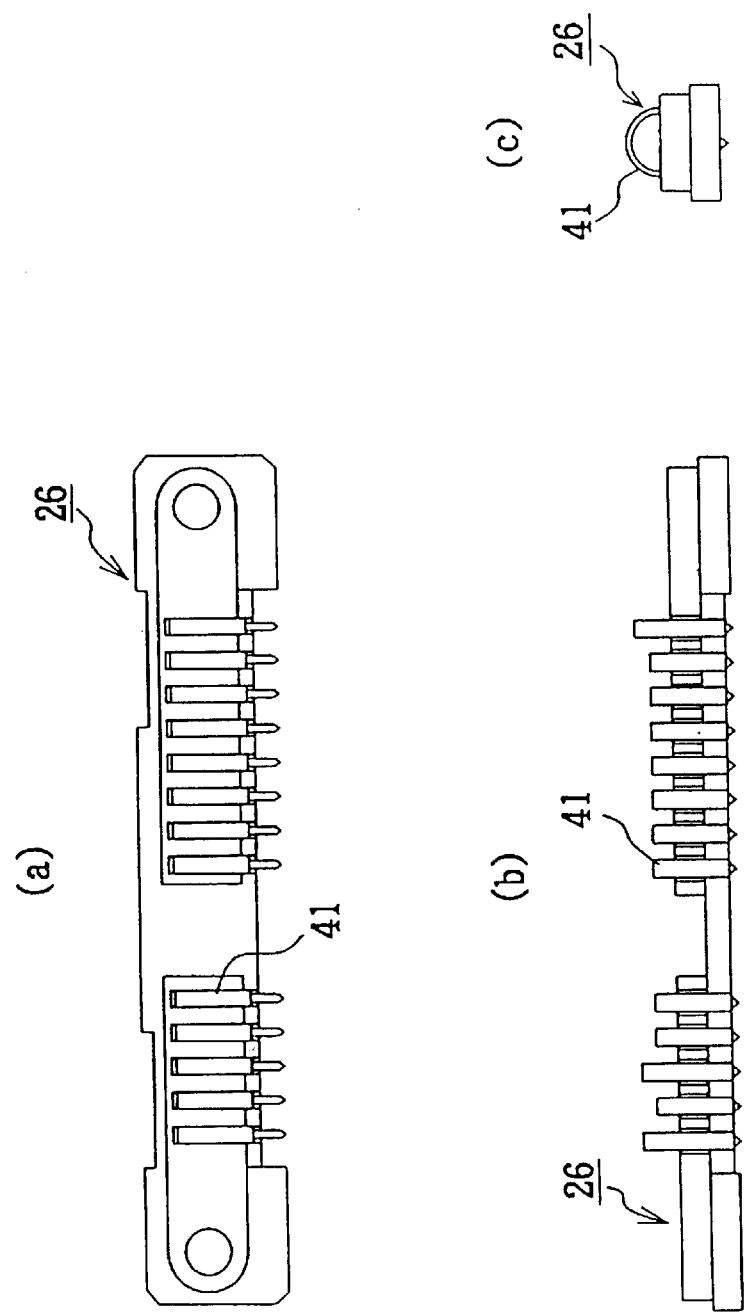

[Figure 14]
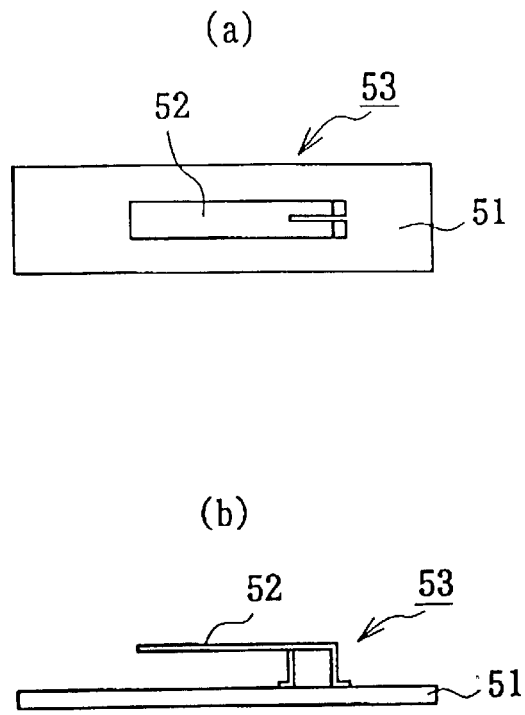
[Figure 15]
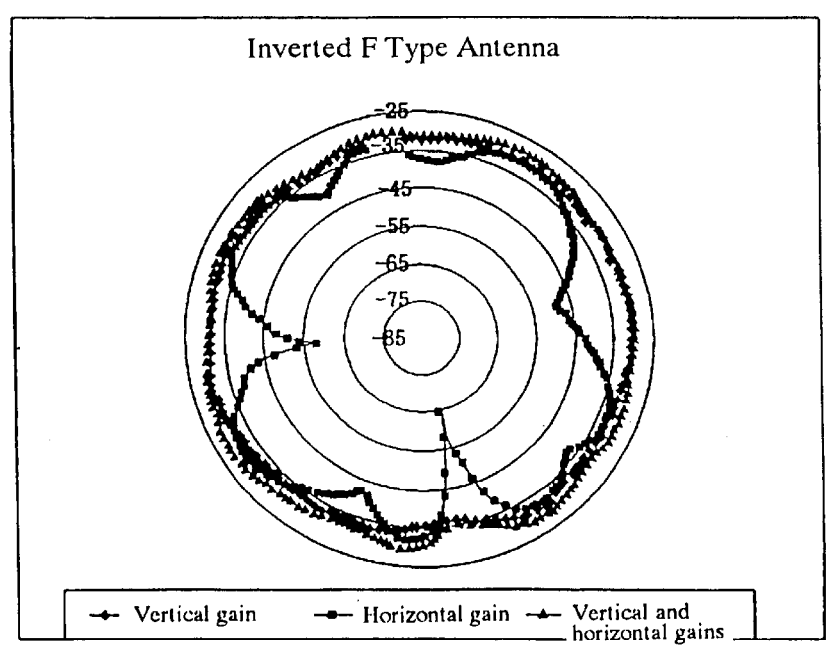

COMPUTER IN WHICH AN OPTIONAL UNIT IS INSTALLABLE

FIELD OF THE INVENTION

The present invention relates to a computer to which an optional unit may be attached. The optional unit may be a wireless LAN unit including a wireless LAN adapter and the like.

BACKGROUND

Constituting a wireless LAN has hitherto been performed, for example, by providing a wireless LAN adapter and an antenna in a computer, particularly a note book computer. Generally, provision of a wireless LAN adapter and an antenna in a computer uses one or two methods. One method takes advantage of the existing external connection port (RS232-C, USB, etc.) of a computer. The second method taking advantage of the existing internal expansion slot (PC-Card, Mini-PCI, etc.) of a computer.

In the method utilizing the existing external connection port in connecting a wireless LAN adapter, communication performance is ensured since an external antenna can be placed at a desired position. However, because a cable for connecting the wireless LAN adapter and the external antenna is a hindrance, the cable will constitute a serious obstacle in carrying the computer or when in a brief case the computer is used. Also, in the case of utilizing the existing internal expansion slot in connecting the wireless LAN adapter, desired communication performance cannot be obtained, since the antenna is at a low position. It is in the shadow of the computer body and adversely influenced by other conductors, such as a metal desk etc.

The foregoing problem is also true for other devices other than the wireless LAN adapter, such as a CCD camera unit and a fingerprint sensor unit. For that reason, computer performance cannot sufficiently be utilized and is influenced in carrying it, as long as the optional unit is connected to the computer by utilizing the existing external connection port or internal expansion slot.

In another method a portion corresponding to a portion for transmitting and receiving infrared rays is provided integrally on the upper edge of a display panel housing. However, if the wireless LAN adapter is integrally provided at this position, it can provide communication performance as an antenna, but there is a problem in that it will become inconvenient in carrying and cannot be exchanged for another unit because the wireless LAN adapter and antenna are fixed integrally to the housing. Furthermore, although the portion corresponding the transmitting-receiving portion of infrared rays may be small in size and therefore can be provided integrally in the thin display panel housing, it is difficult to provide a relatively large unit, such as a wireless LAN adapter, integrally in the thin display panel housing.

SUMMARY OF THE INVENTION

Thus it is an object of the present invention to provide an option-unit attachable computer in which performance necessary for each optional unit, such as communication performance, is compatible with portability in carrying the computer and usability in using the computer with it put in a brief case and also which renders easy attaching and detaching possible, while overcoming the aforementioned problems.

The present invention is directed to a computer in which an optional unit such as a unit including a wireless LAN adapter is installable, the computer comprising at least a computer body, a display, and a keyboard. The invention is also directed to a note book computer, which comprises a computer body with a keyboard, and a display workable as a lid being opened and closed free with the computer body. In these computers with an optional unit, the optional unit is detachably attached to the top of the display, or the optional unit is detachably attached to a portion of the display, the portion being at a side of the display when the lid is closed and being at a top of the display when the lid is opened.

The present invention detachably attach an optional unit to the top of a display in the condition in which the computer is actually used, and thereby can obtain an option-unit attachable computer in which performance necessary for each optional unit, such as communication performance, is compatible with portability in carrying the computer and usability in using the computer with it put in a brief case and also which renders easy attaching and detaching possible.

In preferred forms of the present invention, the optional unit is a wireless LAN unit. The wireless LAN unit includes at least a wireless LAN adapter, an antenna, and a connector, and the wireless LAN adapter, the antenna, and the connector are formed integrally with one another. Also, the antenna is either a chip antenna or an inverted F type antenna, and in the case of the chip antenna, it is perpendicular to the display. The connector includes a USB interface. In addition, the optional unit is either a charge-coupled device (CCD) camera unit or a fingerprint sensor unit or a speaker unit. Moreover, the optional unit is detachably attached by connecting or disconnecting a connector of the optional unit and a connector provided at a predetermined position on the computer. At this time, the connector of the computer is configured so that a flexible cable is exposed. The connector of-the optional unit is a spring connector. Furthermore, the optional unit is a blind cover serving as a lid when the optional unit is unnecessary. In all the examples, the present invention can be executed in a preferred form.

BRIEF DESCRIPTION OF THE DRAWINGS

These and other objects, features, and advantages of the present invention will become apparent upon further consideration of the following detailed description of the invention when read in conjunction with the drawing FIGS, in which:

FIGS. 1A to 1E are perspective views showing the positions on a laptop computer at which antennae are installed when communication performance is measured, respectively;

FIGS. 2A and 2B are diagrams showing an example of an antenna used in the measurement of communication performance;

FIG. 3 is a diagram for describing the method of measuring communication performance;

FIG. 4 is a graph showing an example of the measurement result of the communication performance;

FIG. 5 is a graph showing another example of the measurement result of the communication performance;

FIG. 6 is a graph showing still another example of the measurement result of the communication performance;

FIG. 7 is a graph showing a further example of the measurement result of the communication performance;

FIG. 8 is a graph showing a further example of the measurement result of the communication performance;

FIGS. 9A to 9C are diagrams for describing an example of mounting an optional unit on the LCD top of a laptop computer, respectively;

FIG. 10 is a diagram showing an example of an optional unit having a wireless LAN adapter and an antenna formed integrally with each other;

FIG. 11 is a diagram showing a connection example of the wireless LAN optional unit;

FIG. 12 is a diagram showing an example of a flexible cable within the LCD;

FIGS. 13A to 13C are diagrams showing the construction of a connector, respectively;

FIGS. 14A to 14B are diagrams showing the construction of an antenna, respectively; and FIG. 15 is a graph showing another example of the measurement results of communication performance.

DESCRIPTION OF SYMBOLS

1 . . . Standard gain horn antenna
2 . . . Laptop computer
3 . . . Metal table
4 . . . Turn table
5 . . . Network analyzer
11, 31 . . . LCD
12 . . . Blind cover
13 . . . Connecting portion
14, 21 . . . Optional unit
22 . . . Board
23 . . . wireless LAN adapter
24 . . . Chip antenna
26 . . . Connector
27 . . . Regulator
28 . . . Screw portion
32 . . . Rotating plate
34 . . . Flexible cable
35 . . . Opening
41 . . . Spring pin
51 . . . Board
52 . . . Antenna
53 . . . Inverted F type antenna

DESCRIPTION OF THE INVENTION

An optional-unit attachable computer in accordance with the present invention is hereinafter described with reference to a notebook-sized or laptop personal computer, which is configured of a computer body with a keyboard and a display serving as a freely closable lid with respect to the computer body, as an example. However, it is a matter of course that the present invention is likewise applicable to ordinary personal computers with at least a computer body, a display, and a keyboard. Also, an optional unit will be described with a wireless LAN unit, in which a wireless LAN adapter and an antenna are formed integrally with each other, as an example. It is a matter of course that the present invention is similarly applicable to other units such as a charge-coupled device (CCD) camera unit. Note that the following description will be given with regard to the observations of the attaching position for the wireless LAN adapter and the observations of a method for mounting the wireless LAN adapter.

REGARDING THE OBSERVATIONS OF THE ATTACHING POSITION FOR THE WIRELESS LAN ADAPTER

First, communication performance was measured under the five following conditions in order to determine the attaching position for a wireless LAN adapter. FIGS. 1A to E show examples of a laptop personal computer corresponding to the above-mentioned five conditions. FIG. 2A shows an example of a dipole antenna used in the measurement of the communication performance, and FIG. 2B shows an example of a chip antenna used in the same measurement. Note that while, in the examples shown in FIGS. 1A to E, the position of the antenna is shown by showing either only the dipole antenna or the chip antenna, in actual measurements the communication performances of both antennae were measured at the respective positions.

1. FIG. 1A shows the case of unfolding the dipole antenna from the top of a liquid crystal display (LCD) perpendicularly to the LCD top,
2. FIG. 1B shows the case of unfolding the dipole antenna from the side of the LCD perpendicularly to the LCD side,
3. FIG. 1C shows the case of fixing the chip antenna on the back of the LCD horizontally to the LCD back,
4. FIG. 1D shows the case of fixing the chip antenna on the top of the LCD horizontally to the LCD top, and
5. FIG. 1E shows the case of fixing the chip antenna on the side of the LCD horizontally to the LCD side.

FIG. 3 is a diagram for describing the method of measuring communication performance. In the example shown in the figure, reference numeral 1 denotes a standard gain horn (SGH) antenna used as a receiving antenna; 2 a laptop personal computer with an antenna at a predetermined position shown in FIGS. 1A to E; 3 a metal table; 4 a turn table for setting the laptop personal computer 2 on the metal table 3 so that the computer 2 is rotatable; and 5 a 8510 network analyzer (made by Hewlett Packard) used for measuring the pass loss between the antenna of the laptop personal computer 2 and the SGH antenna 1. With this construction, the gain of the antenna of the rotatable laptop personal computer 2 was measured in an anechoic room. The results of the measurement are shown in FIGS. 4 to 8. In the examples shown in the figures, the outermost plots in each graph were obtained by measuring the dipole antenna, whose gain is known, in a free space (without attaching to a case) in order to normalize measurement results. One of the inner plots was obtained by measuring the dipole antenna attached to the laptop personal computer in the above-mentioned manner (after normalization), while the other was obtained by measuring the chip antenna attached to the laptop personal computer. Each graph indicates the gains in the horizontal direction between 0 and 360 degrees, and the outer plot indicates higher antenna performance.

From the results of FIGS. 4 to 8 it follows that the antenna whose communication performance is highest is the case of mounting the antenna on the top of the LCD (FIG. 4, i.e., the case of the antenna's position A in FIG. 1. However, a moving part has to be provided in the RF portion, since the antenna is folded and housed. For this reason, not only is the cost high, but there is also a problem that in the unfolded condition, the antenna is easily breakable when the computer is carried or when in a brief case the computer is used. Therefore, this case cannot be said to be optimal. Of course, with the knowledge of the problem, it is possible to attach an optional unit, in which an unfolded antenna (the antenna's position A in FIG. 1) is formed integrally with a wireless LAN adapter, to the USB port of the present invention. Also, in the case where an existing external connection port (RS232-C, USB, etc.) is utilized in connecting the wireless LAN adapter, an external antenna can be placed at a desired position through a cable and therefore it is considered that the same communication performance as that at these attaching positions are ensured. However, it is a matter of course that the antenna will constitute a serious obstacle, since the cable is a hindrance.

On the other hand, it is seen that the case of fixing the antenna to the side of the computer body (FIG. 8, i.e., the case of the antenna's position E in FIG. 1) is lowest in communication performance. Therefore, in the case of fixing the antenna to the side of the computer body, for example, in the case where an existing internal expansion slot (PC-Card, Mini-PCI, etc.) is utilized in connecting the wireless LAN adapter, no problem will occur when the computer is carried or when in a brief case the computer is used. However, since the antenna is at the same low position as the attaching position in this case, i.e., if the antenna is placed on the side of the computer body, the antenna is located at a position near a desk when the PC is used on the desk, and consequently, it is considered that desired communication performance cannot be obtained.

From the foregoing measurement results it is seen that in order to obtain the compatibility between (1) communication performance and (2) portability in carrying a PC and usability in using the PC with it put in a brief case, the antenna is advantageously fixed on the LCD top (antenna's positions C, D in FIG. 1), particularly at a position (antenna's position D in FIG. 1) which is on the side of the LCD when the lid is closed and on the top of the LCD when the lid is open. The antenna at these positions has good performance; is not easily breakable; does not constitute an obstacle; and has good external appearance. In addition, in the case of a chip antenna, it is small in dimensions and therefore it can be provided on the LCD top perpendicularly to the top, as shown in FIG. 1A. It is evident from the results of FIGS. 4 to 8 that positions such as those shown in FIGS. 1C and D are optimal to meet the above-mentioned conditions.

REGARDING THE OBSERVATIONS OF A METHOD FOR MOUNTING A WIRELESS LAN ADAPTER

When the wireless LAN adapter is mounted on the computer body side of a laptop PC with an antenna provided on the top of the LCD, the wireless LAN adapter and the antenna have to be connected via a cable and a connector. Since the frequency used in an ordinary wireless LAN is as high as a few GHz (e.g., 2.5 G Hz), there a possibility that a great loss will occur, as long as the matching between the impedances of the cable and the connector is not performed. In addition, because the cable and the connector are both coaxial types, they are not only expensive but also thick and difficult to bend. Therefore, if the wireless LAN adapter in the computer body and the antenna on the LCD top are connected via a coaxial cable, it is very difficult to pass them through the hinge of the LCD.

For that reason, in an example of an advantageous embodiment of the present invention, an optional unit, in which a wireless LAN adapter and an antenna are formed integrally with each other, is mounted on the LCD top to overcome these problems as described later. In ordinary wireless LANs, the transmission frequency is as high as a few G Hz, but the data rate is relatively as low as a few M bit/s. Therefore, an inexpensive, flexible cable can be used for connecting the wireless LAN adapter on the LCD top and a circuit within the computer body. For that reason, it becomes easy to pass them through the hinge of the LCD. In addition, if a connector on the wireless LAN adapter side is made a contact type connector making use of a spring pin, the computer body side can be contacted directly to the flexible cable and eliminate the connector provided on the computer body side. Therefore, an optional unit, which includes a wireless LAN adapter formed integrally with an antenna at the top of a thin LCD, can be detachably attached without substantially having influence on the volume and weight of the computer body and furthermore at a low cost.

Next, a description will be made of an example that mounts a wireless LAN adapter. FIGS. 9A to C are diagrams for describing an example of mounting an optional unit on the LCD top of a laptop computer, respectively. First, in the case of using no optional unit, as shown in FIGS. 9A and B, a blind cover 12 is attached at a position that becomes an upper position when the LCD 11 of a laptop computer 2 is used, i.e., when the LCD 11 is open so that the display section can be viewed. With the blind cover 12 thus attached, the connecting portion 13 of a flexible cable can be protected and, at the same time, the external appearance can be maintained. In the case of using an optional unit, as shown in FIG. 9C, the optional unit 14 is attached at the above-mentioned position on the top of the LCD 11.

Next, a description will be given of an example of an optional unit having a wireless LAN adapter and an antenna formed integrally with each other and a connection example of an optional unit including a wireless LAN adapter. FIG. 10 is a diagram showing an example of the optional unit having a wireless LAN adapter and an antenna formed integrally with each other. In the wireless LAN optional unit 21 shown in FIG. 10, a board 22 is provided with a wireless LAN adapter 23, a chip antenna 24 with its principal plane stood up with respect to the board 22, a connector 26 with 13 pins, and a regulator 27 for regulating a USB power source of 5 V down to 3.3 V which the wireless LAN adapter requires. Although omitted in this example, a cover which transmits an electromagnetic wave is usually used to protect the above-mentioned components. Also, the optional unit 21 can be attached to the computer body by using both screw portions 28 (or other mechanical attachment means) of the connector 26.

FIG. 11 is a diagram showing a connection example of the wireless LAN optional unit 21. In the example shown in FIG. 11, the spring connector with 13 pins, which constitutes the connector 26 of optional unit 21, is contacted through an opening 35 with the 13 conductive portions 33 of a flexible cable 34 exposed to the surface of a fixing plate 32 bent by 90 degrees at the top of an LCD 31. In this way, the computer body and the optional unit 21 are connected. With this construction, a connector on the computer body side becomes unnecessary and a connecting portion can be configured within the panel of the thin LCD 31. In addition, as shown in FIG. 12, a flexible cable 34 can be connected at a low cost without substantially having influence on the volume and weight of the computer body, since it is also used as a cable within the LCD 31.

Also, a universal serial bus (USB) which is a general-purpose interface is adopted as an electrical interface between the optional unit 21 and the computer body. By adopting the USB in an electrical interface, even an optional unit for USB devices (e.g., a CCD camera, a fingerprint sensor, a speaker, etc.) other than the optional unit for a wireless LAN adapter can easily be used if only a change is made on a mechanical interface (connector portion).

Next, a description will be given of an example of connection ports provided in both the connector 26 and the flexible cable. FIGS. 13A to C are a plan view, a front view, and a side view showing the construction of the connector 26 with 13 pins, respectively. As shown in the figures, the connector 26 has 13 spring pins 41. In this example, pins 1, 3, 13 are longer than the other pins, and the pins 1, 3, 13 are designed so that they first contact an optional unit when connected to the optional unit. Therefore, it is possible to attach and detach the connector 26 during operation (hot plug). Pin array examples of connection ports in the above-mentioned connector 26 are listed in Table 1.

In Table 1, two pins, D+ and D−, are each a standard USB interface. Also, Wake_up, Detach, BT_FlashUpd#, and BTPWRBTN# are signals used auxiliary in the wireless LAN adapter and are not in other USB devices (a CCD camera, a fingerprint sensor, a speaker, etc.).

TABLE 1

| Pin | Name | Description |
| --- | --- | --- |
| 1 | GND | Frame GND |
| 2 | Reserve | Reserve for future use |
| 3 | VCC | +5 V, 500 mA |
| 4 | BTPWRBTN# | BT sideband - 0: Power button pressed, 1: Power button not pressed |
| 5 | GND | Signal GND |
| 6 | D+ | USB Data |
| 7 | D− | USB Data |
| 8 | GND | Signal GND |
| | KEY | |
| 9 | Wake_up | BT sideband - 0: Wakeup event not exit, 1: Wakeup event exist |
| 10 | Detach | BT sideband - 0: Attach to USB, 1: Detach from USB |
| 11 | BT_FlashUpd# | BT sideband - 0: Reset after flash update, 1: Normal operation |
| 12 | Reserve | Reserve for future use |
| 13 | GND | Frame GND |

Note that while, in the above-mentioned embodiment, the dipole antenna and the chip antenna have been shown as an antenna, the present invention can also employ an inverted F type antenna shown in FIGS. 14A and B. In the figures, reference numeral 51 denotes a board and 52 an antenna. The board 51 and the antenna 52 constitute the inverted F type antenna 53. The inverted F type antenna shown in FIGS. 14A and B was attached on the top (point end) of an LCD and the communication performance was measured by the same method of measurement as that shown in FIG. 3. The results are shown in FIG. 15. In a graph shown in FIG. 15, the vertical gain, horizontal gain, and total gain of the inverted F type antenna are shown separately, unlike the examples of FIGS. 4 to 8. From the results shown in FIG. 15 it is seen that the inverted F type antenna, as with the chip antenna, can suitably be used as an antenna for the wireless LAN optional unit of the present invention. In addition, the dimension of the board 51 shown in FIG. 14A is 60 mm×16 mm. Therefore, if the inverted F type antenna is used, it is seen that the same performance can be realized by smaller dimensions.

Thus, according to the present invention, an optional unit is detachably provided on the top of a display in the condition in which the computer is actually used. The present invention, therefore, is able to obtain an option-unit attachable computer in which performance necessary for each unit, such as communication performance or the like, is compatible with portability in carrying the computer and usability in using the computer with it put in a brief case and also which renders easy attaching and detaching possible. It is noted that other embodiments using the concepts of the present invention may be implemented by those skilled in the art. For example, other antenna types and/or other mechanical mounting and adjusting means may be employed, and/or the optional unit may be coupled through a computer peripheral.

What is claimed, is:

1. A computer, comprising:

a computer body;

a display;

a keyboard;

a fixing plate affixed to said display;

a flexible cable having a portion installed over said fixing plate, said portion having exposed conductors to which an electrical connection can be made, said flexible cable connecting to circuitry of said computer; and an optional unit configured to be detachably attachable to the display and having spring connectors, the spring connectors being sized, shaped and positioned so as to provide an electrical connection to said exposed conductors when said optional unit is attached to said display.

2. A computer according to claim 1, wherein the optional unit is a wireless LAN unit.

3. A computer according to claim 2, wherein the wireless LAN unit includes at least a wireless LAN adapter, an antenna, and a mating connector.

4. A computer according to claim 3, wherein the wireless LAN adapter, the antenna, and the mating connector are formed integrally with one another.

5. A computer according to claim 3, wherein the antenna is one of a chip antenna, a dipole antenna and an inverted F antenna.

6. A computer according to claim 1, wherein the connector includes a universal serial bus interface.

7. A computer according to claim 1, wherein the optional unit includes at least one of a charge-coupled device camera unit, a fingerprint sensor unit, and a speaker-unit.

8. A computer according to claim 1, further comprising an additional optional unit configured as a blind cover serving as a lid when another optional unit is unnecessary.

9. A computer according to claim 1, wherein said fixing plate is disposed in a opening in said display.

10. A computer according to claim 1, wherein the fixing plate is disposed and said optional unit is configured so that said optional unit can be detachably attached to the top of said display.

11. A computer according to claim 1, configured with a base, wherein the display is in the form of a display lid which is movable to cover said base, and the fixing plate is disposed and said optional unit is configured, so that said optional unit can be detachably attached to a portion of said display which is at a side of the display when the display lid is closed and is at the top of the display when the display lid is opened.

12. A computer according to claim 1, configured with a base, wherein the display is in the form of a display lid which is movable to cover said base, and the fixing plate is disposed and said optional unit is configured, so that said optional unit can be detachably attached to said display lid at a position that becomes an upper position when the display is in an operating position with the lid open so that the display can be viewed.

13. A computer, comprising:

a computer body;

a display;

a keyboard, a first connector installed at a periphery of the display, and an optional wireless LAN unit configured to be detachably attachable to the first connector, the wireless LAN unit including at least a wireless LAN adapter, an antenna, and a mating connector, integrally formed with one another, said adapter, said antenna, and said mating connector all disposed in said optional LAN unit.

14. A computer according to claim 13, wherein the first connector comprises:

a fixing plate affixed to said display; and a flexible cable having a portion installed over said fixing plate, said portion having exposed conductors to which an electrical connection can be made, said flexible cable connecting to circuitry of said computer.

15. A computer according to claim 14, wherein said fixing plate is disposed in a opening in said display.

16. A computer according to claim 14, wherein the fixing plate is disposed and said optional unit is configured so that said optional unit can be detachably attached to the top of said display.

17. A computer according to claim 14, configured with a base, wherein the display is in the form of a display lid which is movable to cover said base, and the fixing plate is disposed and said optional unit is configured, so that said optional unit can be detachably attached to a portion of said display which is at a side of the display when the display lid is closed and is at the top of the display when the display lid is opened.

18. A computer according to claim 14, configured with a base, wherein the display is in the form of a display lid which is movable to cover said base, and the fixing plate is disposed and said optional unit is configured, so that said optional unit can be detachably attached to said display lid at a position that becomes an upper position when the display is in an operating position with the lid open so that the display can be viewed.

* * * * *